United States Patent
Kim et al.

(10) Patent No.: US 9,501,090 B2
(45) Date of Patent: Nov. 22, 2016

(54) APPARATUS AND METHOD FOR PROCESSING SIGNAL

(71) Applicant: SAMSUNG ELECTRONICS CO., LTD., Suwon-si (KR)

(72) Inventors: JongPal Kim, Seoul (KR); TakHyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/798,665

(22) Filed: Jul. 14, 2015

(65) Prior Publication Data

US 2016/0179129 A1 Jun. 23, 2016

(30) Foreign Application Priority Data

Dec. 23, 2014 (KR) ........................ 10-2014-0187466

(51) Int. Cl.
*H03L 7/00* (2006.01)
*G06F 1/12* (2006.01)

(52) U.S. Cl.
CPC ........................................ *G06F 1/12* (2013.01)

(58) Field of Classification Search
USPC .................... 327/144, 147–149, 156–158
See application file for complete search history.

(56) References Cited

U.S. PATENT DOCUMENTS

| | | | | |
|---|---|---|---|---|
| 4,303,978 A | * | 12/1981 | Shaw | G01C 21/16 244/177 |
| 6,032,109 A | * | 2/2000 | Ritmiller, III | G01D 3/022 702/104 |
| 7,164,307 B2 | | 1/2007 | Tschanz et al. | |
| 8,454,505 B2 | * | 6/2013 | Yazicioglu | A61B 5/04 600/300 |
| 8,604,944 B2 | | 12/2013 | Berkley et al. | |
| 8,742,831 B2 | * | 6/2014 | Fechner | H03F 1/301 327/534 |
| 2008/0183098 A1 | * | 7/2008 | Denison | A61B 5/0002 600/547 |
| 2008/0215850 A1 | * | 9/2008 | Berkley | G06N 99/002 712/1 |
| 2010/0036211 A1 | * | 2/2010 | La Rue | A61B 5/0002 600/301 |
| 2010/0067553 A1 | * | 3/2010 | McKinney | H04J 3/0664 370/503 |
| 2010/0080270 A1 | * | 4/2010 | Chen | H04L 27/0008 375/219 |
| 2010/0208560 A1 | * | 8/2010 | Kobayashi | G11B 7/1263 369/47.25 |
| 2010/0225496 A1 | * | 9/2010 | Hou | H01M 10/48 340/636.1 |
| 2011/0080925 A1 | * | 4/2011 | Molina | H03M 1/0872 370/538 |
| 2011/0280349 A1 | * | 11/2011 | Hong | H04L 25/0216 375/344 |
| 2012/0276853 A1 | * | 11/2012 | De Ruijter | H04W 24/06 455/67.11 |
| 2013/0120036 A1 | * | 5/2013 | Zhu | H03L 7/0805 327/156 |
| 2013/0271193 A1 | * | 10/2013 | Keith | H03L 7/0812 327/158 |
| 2014/0118040 A1 | * | 5/2014 | Nakayama | H03L 7/0816 327/157 |
| 2014/0333346 A1 | * | 11/2014 | Bae | H03L 7/087 327/5 |
| 2015/0365071 A1 | * | 12/2015 | Chang | H03H 7/19 327/156 |
| 2015/0381198 A1 | * | 12/2015 | Lasseuguette | G01R 19/2509 341/143 |

FOREIGN PATENT DOCUMENTS

| | | |
|---|---|---|
| JP | 2003-151267 A | 5/2003 |
| KR | 2000-0043105 A | 7/2000 |
| KR | 10-2013-0020338 A | 2/2013 |
| KR | 10-1337333 B1 | 12/2013 |

\* cited by examiner

*Primary Examiner* — Adam Houston
(74) *Attorney, Agent, or Firm* — NSIP Law

(57) ABSTRACT

A method and apparatus process a signal include local clock signal generators configured to, based on a reference clock signal, generate operation clock signals for analog channels and, based on a synchronizing signal, adjust a phase difference among the operation clock signals.

17 Claims, 8 Drawing Sheets

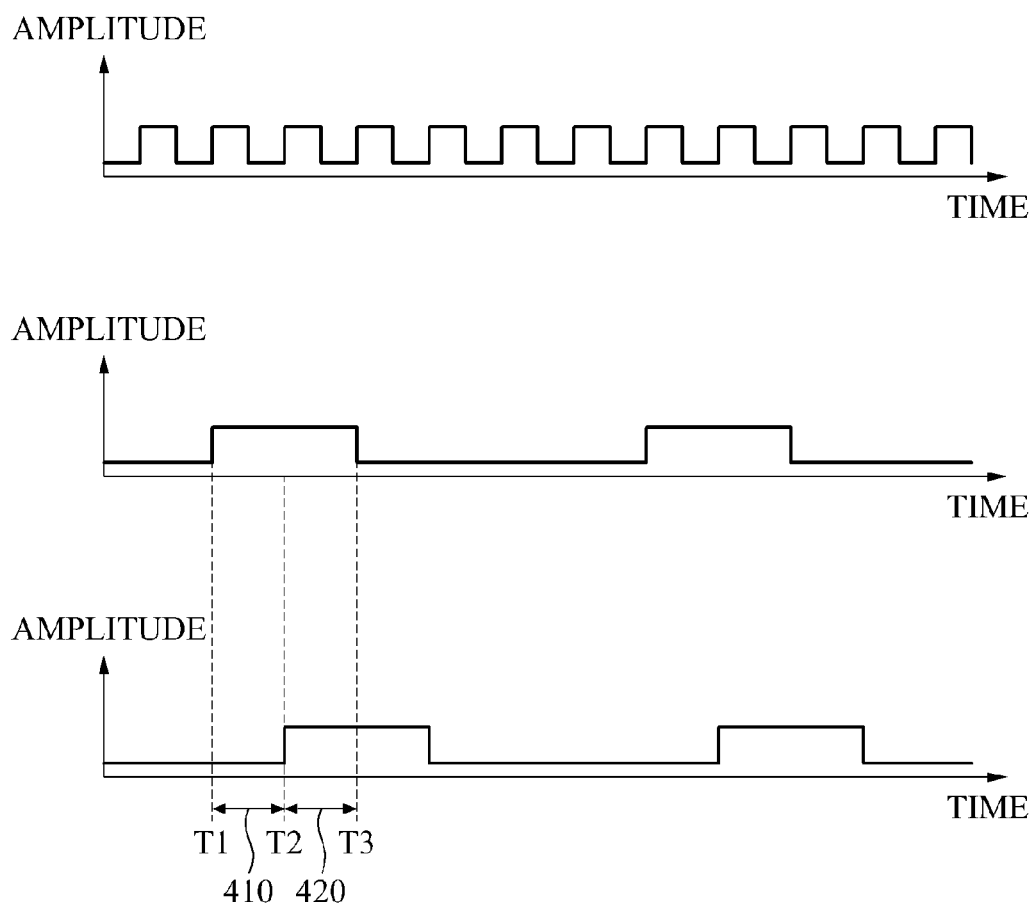

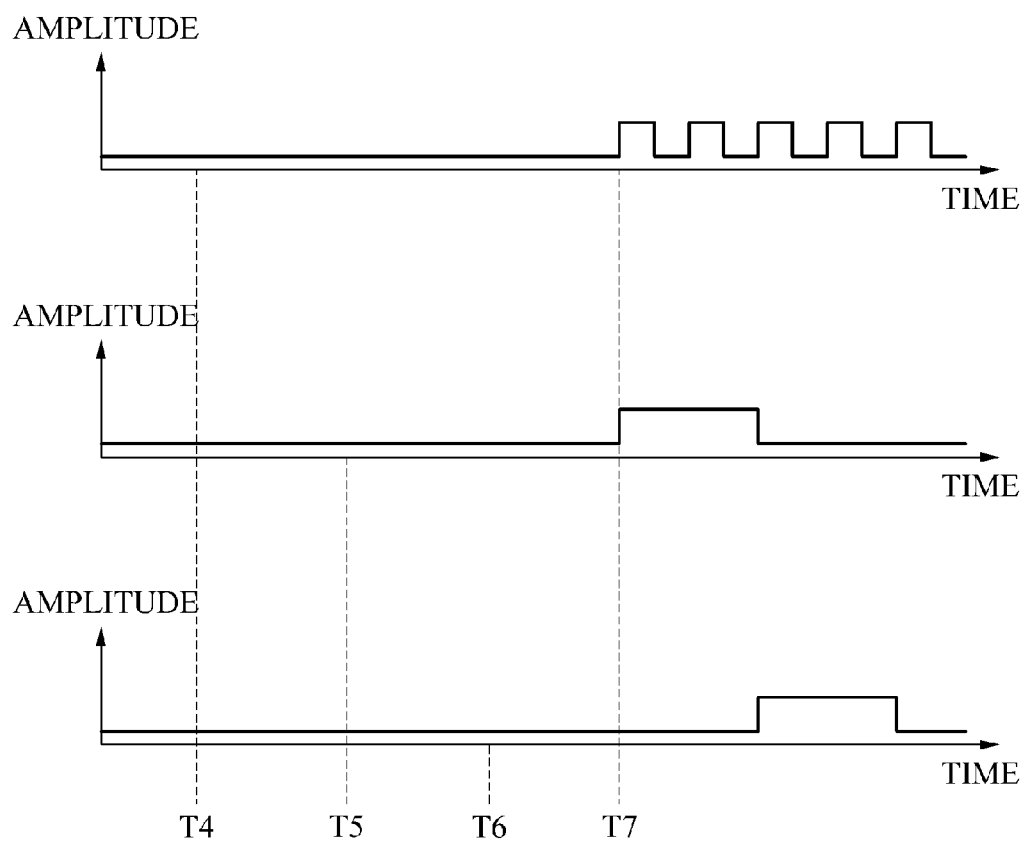

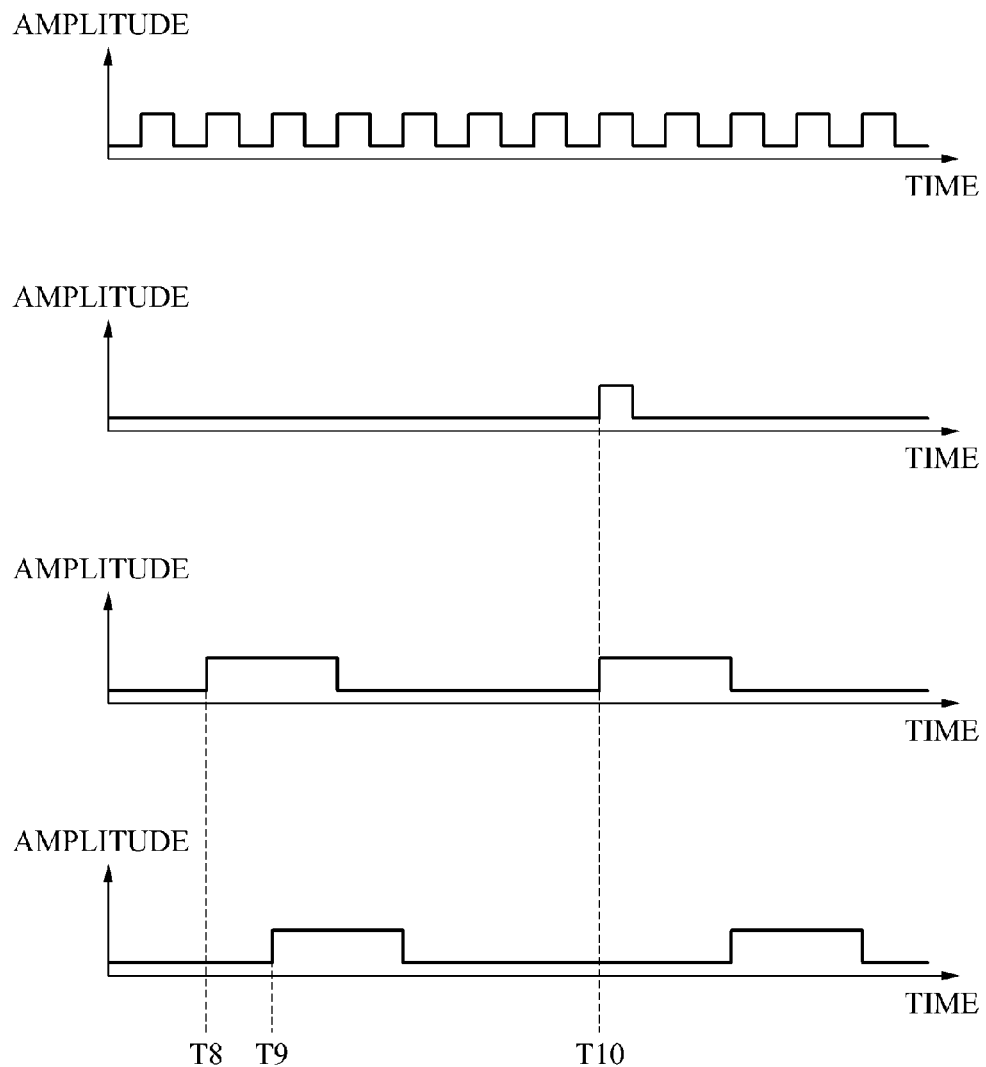

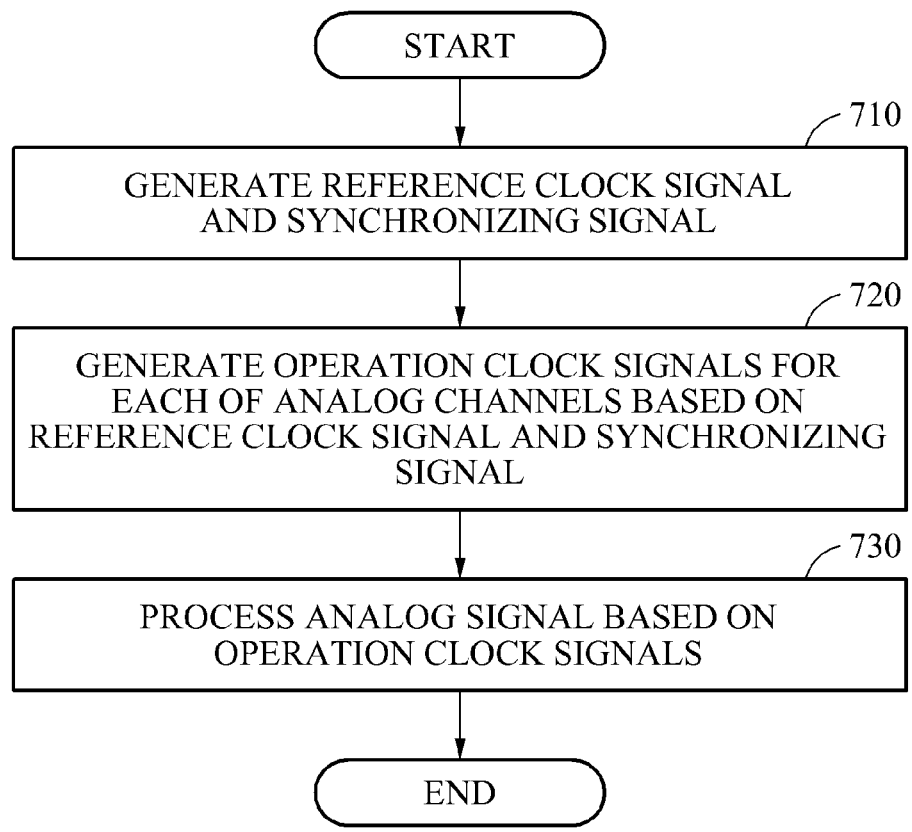

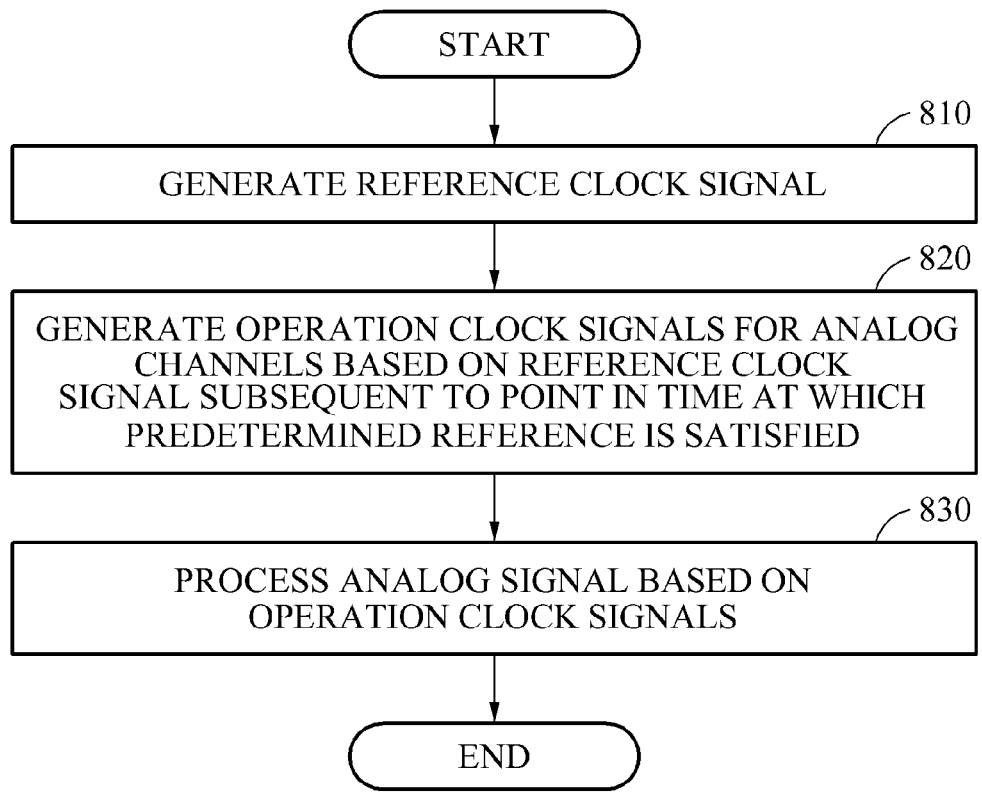

APPARATUS AND METHOD FOR PROCESSING SIGNAL

CROSS-REFERENCE TO RELATED APPLICATION(S)

This application claims the benefit under 35 USC 119(a) of Korean Patent Application No. 10-2014-0187466, filed on Dec. 23, 2014, in the Korean Intellectual Property Office, the entire disclosure of which is incorporated herein by reference for all purposes.

BACKGROUND

1. Field

The following description relates to technology to process a signal in a multi analog channel environment.

2. Description of Related Art

A multi analog channel environment having analog inputs generally includes analog channels, a multiplexer (MUX), and an analog-to-digital converter (ADC). The analog channels process various signals by receiving inputs of various analog signals, and the MUX selectively transmits output signals output from the analog channels to the ADC. The ADC converts the analog signals output from the analog channels into digital signals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an apparatus to process a signal, including local clock signal generators configured to, based on a reference clock signal, generate operation clock signals for analog channels and, based on a synchronizing signal, adjust a phase difference among the operation clock signals.

The apparatus may also include a central clock signal generator configured to supply the reference clock signal and the synchronizing signal to the local clock signal generators.

The local clock signal generators may be configured to generate the operation clock signals based on the synchronizing signal and subsequent to completing a register setting of the operation clock signals for the analog channels.

The local clock signal generators may include a counter configured to output a waveform defined based on the register setting, and set a count value as a set value based on the synchronizing signal.

The local clock signal generators may be configured to generate operation clock signals of which high logic states do not overlap in an identical time interval.

The apparatus may also include local bias signal generators configured to generate operation bias signals for the analog channels based on a reference bias signal.

The apparatus may also include a central bias signal generator configured to supply the reference bias signal.

The local bias signal generators may be configured to generate operation voltage signals for the analog channels based on the reference bias signal being a current signal.

The operation clock signals may include at least one of a clock signal to modulate analog signals input through the analog channels, a clock signal to demodulate the analog signals, a clock signal for filtering the analog signals, and a clock signal to sample the analog signals to be converted into digital signals.

In accordance with an embodiment, there is provided an apparatus to process a signal, including local clock signal generators configured to generate operation clock signals for analog channels based on a reference clock signal and subsequent to a point in time at which a reference is satisfied.

The apparatus may also include a central clock signal generator configured to supply the reference clock signal to local clock signal generators.

The local clock signal generators may be configured to generate the operation clock signals based on the reference clock signal and subsequent to completing a register setting of the operation clock signals for the analog channels.

The local clock signal generators may include a counter configured to output a waveform defined based on the register setting, and set a count value of the counter as a set value based on a reset signal prior to a point in time at which the reference is satisfied.

The central clock signal generator may be configured to supply the reference clock signal to the local clock signal generators subsequent to completing the register setting of the operation clock signals for the analog channels.

The apparatus may also include local bias signal generators configured to generate operation bias signals for the analog channels based on a reference bias signal.

The apparatus may also include a central bias signal generator configured to supply the reference bias signal to the local bias signal generators.

The local bias signal generators may be configured to generate operation voltage signals for the analog channels based on the reference bias signal being a current signal.

In accordance with an embodiment, there is provided a method to process a signal, including generating a reference clock signal and a synchronizing signal; and generating operation clock signals, using local clock signal generators, for each of analog channels based on the reference clock signal and by adjusting a phase difference among the operation clock signals based on the synchronizing signal.

The generating of the operation clock signals may include generating the operation clock signals based on the synchronizing signal subsequent to completing a register setting of the operation clock signals for the analog channels.

The generating of the operation clock signals may include generating operation clock signals of which high logic states do not overlap in an identical time interval.

The operation clock signals may include at least one of a clock signal to modulate analog signals input through the analog channels, a clock signal to demodulate the analog signals, a clock signal to filter the analog signals, and a clock signal to sample the analog signals to be converted into digital signals.

Other features and aspects will be apparent from the following detailed description, the drawings, and the claims.

BRIEF DESCRIPTION OF THE DRAWINGS

FIGS. 4 through 6 are diagrams illustrating examples of generating synchronized operation clock signals by local clock signal generators, in accordance with an embodiment.

FIG. 7 is a flowchart illustrating an example of a signal processing method, in accordance with an embodiment.

FIG. 8 is a flowchart illustrating another example of the signal processing method, in accordance with an embodiment.

Figure 1:
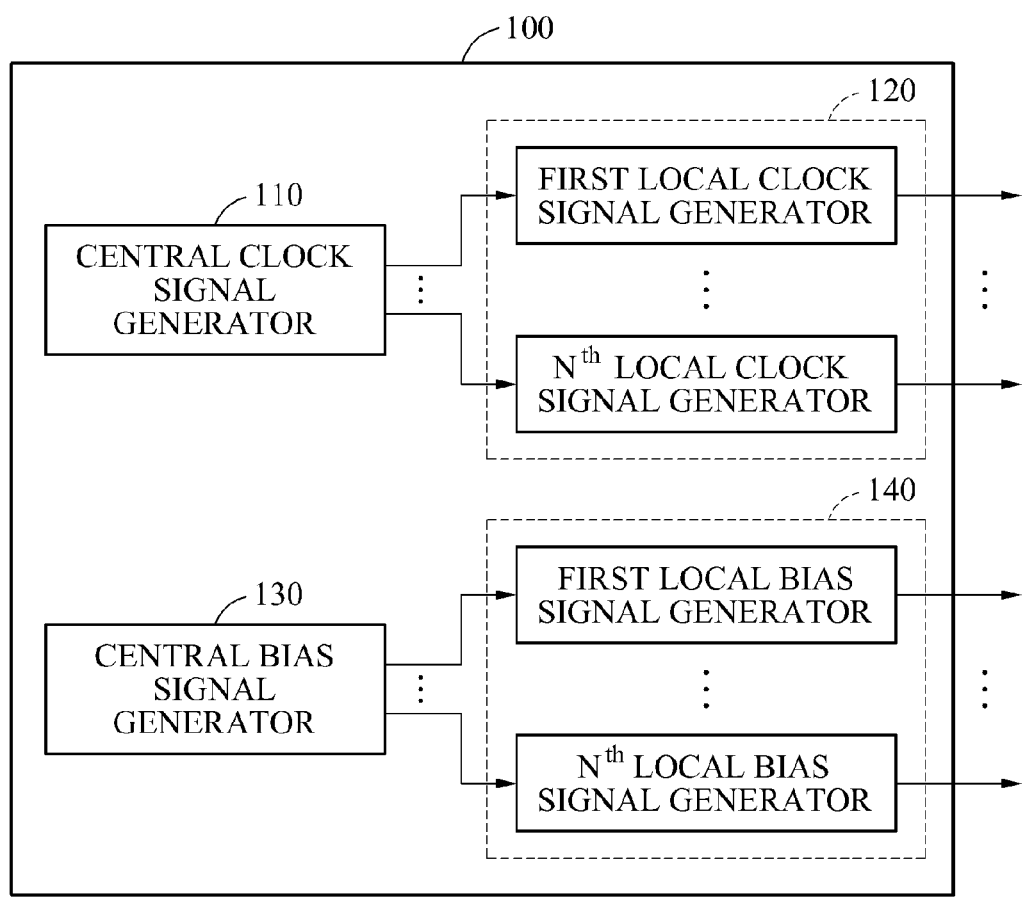
FIG. 1 is a diagram illustrating an example of a signal processing apparatus, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that when an element or layer is referred to as being "on" or "connected to" another element or layer, it can be directly on or connected to the other element or layer or through intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

FIG. 1 is a diagram illustrating an example of a signal processing apparatus, in accordance with an embodiment.

A signal processing apparatus 100 generates a control signal to process analog signals. The analog signals, for example, biosignals, are input to analog channels. Each of the analog channels perform signal processing, for example, modulating or amplifying, of the analog signals based on the control signal generated by the signal processing apparatus 100. The signal processing apparatus 100 generates an operation bias signal and an operation clock signal to be used in the analog channels.

Referring to FIG. 1, the signal processing apparatus 100 includes a central bias signal generator 130 and local bias signal generators 140. The local bias signal generators 140 include, for example, a first local clock signal generator and an N$^{th}$ local clock signal generator. The signal processing apparatus 100 also includes a central clock signal generator 110 and local clock signal generators 120. The local clock signal generators 120 include, for example, a first local clock signal generator and an N$^{th}$ local clock signal generator.

The central bias signal generator 130 supplies a reference bias signal to each of the local bias signal generators 140. The reference bias signal is a bias signal to be a reference for generating operation bias signals for analog channels. The local bias signal generators 140 generate the operation bias signals for analog channels based on the reference bias signal supplied from the central bias signal generator 130.

The reference bias signal is supplied to the local bias signal generators 140. When the central bias signal generator 130 supplies the reference bias signal, a distortion in the reference bias signal may be generated due to an external noise. To reduce an inflow of the external noise to the reference bias signal, the central bias signal generator 130 transmits the reference bias signal in the form of a current signal to each of local bias signal generators 140. The local bias signal generators 140 generate operation voltage signals for analog channels based on the reference bias signal in the form of the current signal.

The central clock signal generator 110 supplies the reference clock signal to the local clock signal generators 120. The reference clock signal is a clock signal used as a reference to generate the operation clock signals for analog channels. The local clock signal generators 120 generate the operation clock signals for analog channels based on the reference clock signal supplied from the central clock signal generator 110. For example, each of the local clock signal generators 120 generates, as an operation clock signal, a clock signal to modulate analog signals input through the analog channels, a clock signal to demodulate the analog signals, a clock signal to filter the analog signals, or a clock signal to sample and hold the analog signals to be converted into digital signals.

The central clock signal generator 110 synchronizes reference points in time among the operation clock signals output from the local clock signal generators 120. For example, when analog signals are converted into digital signals, through an analog-to-digital converter (ADC), scheduling digital conversion at a point in time for each analog signal is necessary in order to accurately operate the ADC. The central clock signal generator 110 controls the local clock signal generators 120 to adjust a phase difference among the operation clock signals controlling the digital conversion at points in time of analog signals to schedule the digital conversion at points in time of analog signals.

In an example, the central clock signal generator 110 generates a synchronizing signal to synchronize a reference point time among the operation clock signals and supplies the synchronizing signal to the local clock signal generators 120. The local clock signal generators 120 identifies the reference point at a time that is set by the central clock signal generator 110 based on the synchronizing signal transmitted from the central clock signal generator 110, and adjusts a phase of the operation clock signals to be output based on the identified reference point in time. The local clock signal generators 120 adjusts the phase of the operation clock signals based on the reference point at a point in time identified from the synchronizing signal. The point in time is subsequent to a register setting of the operation clock signals for analog channels being completed. The phase of operation clock signals is adjusted. As a result, operation clock signals of which high logic states do not overlap in an identical time interval are generated.

In another example, the local clock signal generators 120 generate the operation clock signals based on the reference clock signal and subsequent to a point in time at which a predetermined reference, such as a register setting, is satisfied.

For example, the central clock signal generator 110 blocks a supply of the reference clock signal until the register setting to define the operation clock signals is complete, and supplies the reference clock signal to the local clock signal generators 120 subsequent to the register setting being completed. Subsequent to a point in time at which a definition of the operation clock signals is complete through the register setting, the local clock signal generators 120 generate the operation clock signals based on the reference clock signal supplied from the central clock signal generator 110.

In another example, the central clock signal generator 110 continuously supplies the reference clock signal to the local clock signal generators 120, blocks an internal supply of the reference clock signal until the register setting for defining an operation clock signal in each of the local clock signal generators 120 is complete, and generates the operation clock signal based on the reference clock signal subsequent to the resister setting being completed.

A number of wirings to supply the operation bias signals to the analog channels is reduced by supplying the reference bias signal from the central bias signal generator 130. Each of the local bias signal generators 140 receives the reference bias signal to generate the operation bias signals. Similarly, a number of wirings are included to supply the operation clock signals to the analog channels. The reference clock signal from the central clock signal generator 110 and the operation clock signals based on the reference clock signal from each of the local clock signal generators 120 are transmitted through the wirings.

Figure 2:
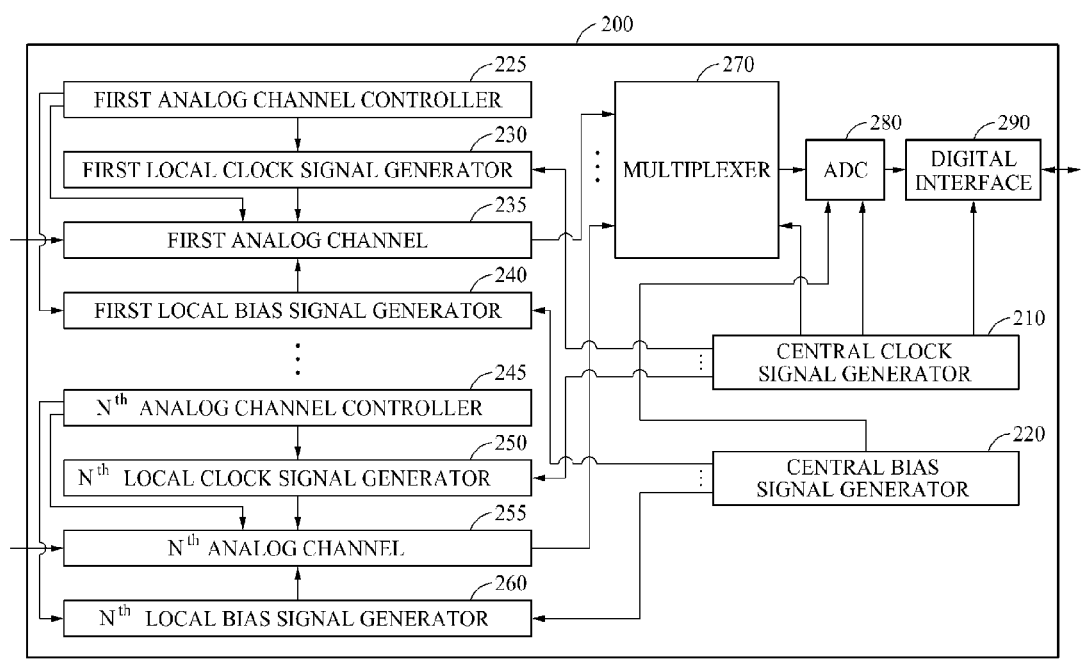
FIG. 2 is a diagram illustrating an example of the signal processing apparatus, in accordance with an embodiment.

FIG. 2 is a diagram illustrating an example of the signal processing apparatus, in accordance with an embodiment.

Referring to FIG. 2, a signal processing apparatus 200 includes a central clock signal generator 210, local clock signal generators, for example, a first local clock signal generator 230 and an $N^{th}$ local clock signal generator 250. The signal processing apparatus 200 also includes a central bias signal generator 220, local bias signal generators, for example, a first local bias signal generator 240 and an $N^{th}$ local bias signal generator 260. Further, the signal processing apparatus 200 includes analog channel controllers, for example, a first analog channel controller 225 and an $N^{th}$ analog channel controller 245, a multiplexer 270, an ADC 280, and a digital interface 290.

Each of the local clock signal generators and each of the local bias signal generators are placed in an adjacent area of an area in which each of analog channels, for example, a first analog channel 235 and an $N^{th}$ analog channel 255, are disposed. Prior to performing an analog-to-digital conversion, preprocessing, such as modulating, demodulating, filtering, or amplifying, the analog signals are processed in each of the analog channels. For example, each of the analog channels includes a high pass filter (HPF), an instrumentation amplifier (IA), a sample and hold, a programmable gain amplifier (PGA), and a lowpass filter (LPF).

The central bias signal generator 220 supplies a reference bias signal to each of the local bias signal generators. For example, the central bias signal generator 220 generates a reference bias signal in a form of a current signal using a bandgap reference circuit. The central bias signal generator 220 generates a number of reference bias signals corresponding to a number of the local bias signal generators, and supplies the generated reference bias signals to the local bias signal generators. In addition, the central bias signal generator 220 supplies a bias signal to the ADC 280.

Each of the local bias signal generators generates operation bias signals to be used in each of the analog channels, based on the reference bias signal received from the central bias signal generator 220. The local bias signal generators generate the operation bias signals as a current signal based on the received reference bias signal. For example, the local bias signal generators generate an operation voltage signal of the IA included in an analog channel, an operation voltage signal of the PGA and the PFL, a p-channel metal-oxide-semiconductor field-effect transistor (PMOS) bias voltage signal in a cascade structure, an n-channel metal-oxide-semiconductor field-effect transistor (NMOS) bias voltage signal in a cascade structure, a PMOS bias voltage signal, and an NMOS bias voltage signal, and provides the signals thereof to an adjacent analog channel.

The central clock signal 210 supplies a reference clock signal to the local clock signal generators and controls a supply of the reference clock signal. For example, the central clock signal generator 210 internally generates a reference clock signal of 32 kilohertz (kHz) for a chip or receives the reference clock signal of 32 kHz from an external structural element, so that the reference clock signal of 32 kHz is supplied to the local clock signal generators.

Each of the local clock signal generators generates the operation clock signals to be used in each of the analog channels based on the reference clock signal received from the central clock signal generator 210. For example, the local clock signal generators generate a clock signal required to modulate an input signal of the IA of analog channel, a clock signal required to demodulate an output signal of the IA, a clock signal used in HPF, a clock signal to generate an input bias of the IA, a clock signal to perform a sample and hold, a clock signal used in the PGA, and a clock signal to sample and digitally modulate an analog signal.

The central clock signal generator 210 generates a synchronizing signal to synchronize a reference point in time among operation clock signals output from the local clock signal generators and supplies the generated synchronizing signal to the local clock signal generators. In addition, the central clock signal generator 210 supplies a reference clock signal, subsequent to a resister setting of the operation clock signals in the local clock signal generators being completed. Related descriptions will be provided with reference to FIGS. 4 through 6.

The analog channel controllers controls the local clock signal generators and the local bias signal generators based on a predetermined control signal. For example, the analog channel controllers control a power on and off, an enable and disable, a gain, or a bandwidth of a sub function block in an analog channel based on the control signal. The analog channel controllers adjust a value of an operation bias signal output from the local bias signal generators, define a frequency and a pattern of the operation clock signal output from the local clock signal generators, and control adjustment of a relative phase difference among operation clock signals. The analog channel controllers communicate with an outside through a serial-to-parallel interface (SPI).

A required length and a design of a wiring area is reduced by generating and supplying, in an adjacent area of the analog channels, the operation bias signals and the operation clock signals for the analog channels. An influence of a noise flowing into the wiring is reduced according to a reduction in the length of wiring at which the operation bias signals or the operation clock signals are transmitted.

The multiplexer 270 selectively transmits, to the ADC 280, an output signal to be digitally converted among output signals transmitted from the analog channels. For example, the multiplexer 270 selects an output signal to be transmitted to the ADC 280 among the output signals transmitted from the analog channels through a switching operation. The central clock signal generator 210 supplies a clock signal required for the switching operation to the multiplexer 270.

The ADC 280 converts an analog signal transmitted from the multiplexer 270 into a digital signal through a sample and hold process. The central clock signal generator 210 supplies a clock signal for a sample and hold operation to be executed at the ADC 280. The ADC 280 digitally converts the output signal and outputs a digitally converted output signal through the digital interface 290. In one embodiment, the digitally converted output signal is transmitted to an external device from the signal processing apparatus 200. The central clock signal generator 210 generates a clock signal and provides the generated clock signal to the digital interface 290.

Figure 3:
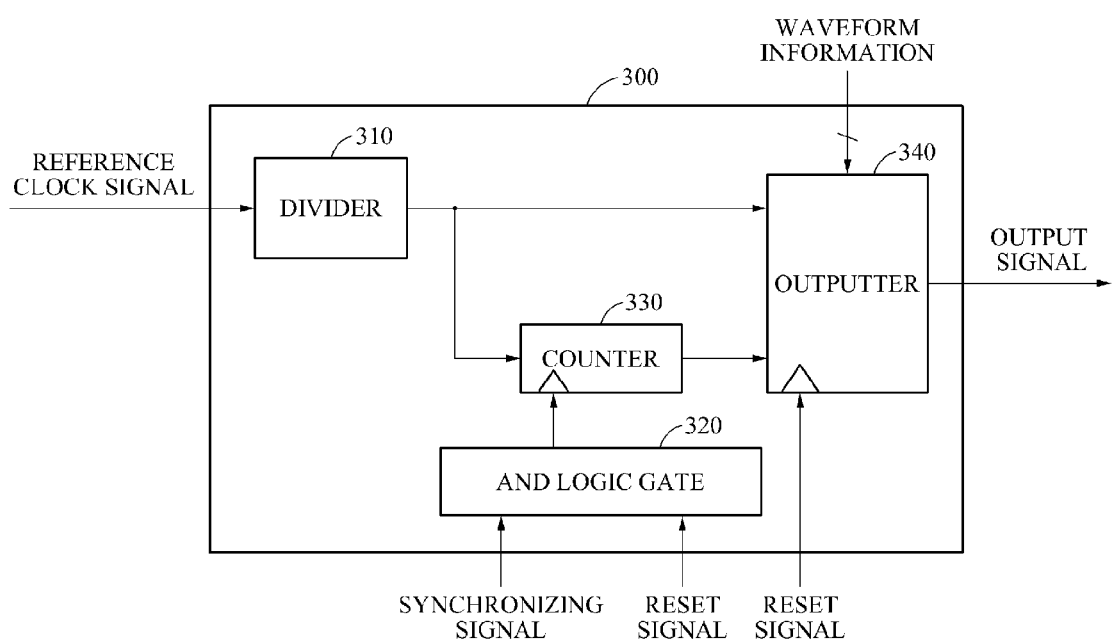
FIG. 3 is a diagram illustrating an example of a local clock signal generator, in accordance with an embodiment.

FIG. 3 is a diagram illustrating an example of a local clock signal generator, in accordance with an embodiment. Referring to FIG. 3, a local lock signal generator 300 includes a divider 310, an AND logic gate 320, a counter 330, and an outputter 340.

The divider 310 divides a reference clock signal received from a central clock signal generator and outputs the divided clock signals. For example, the divider 310 divides a reference clock signal by "m", which is a natural number, and outputs the divided clock signals.

The counter 330 outputs a waveform defined by a register setting. In an example, the counter 330 sets a count value of the counter 330 as a predetermined set value based on a synchronizing signal received from the central clock signal generator. In another example, the counter 330 sets a count value of the counter 330 as a predetermined set value based on a reset signal prior to a point in time at which the predetermined reference is satisfied.

The counter 330 operates based on the divided clock signals received from the divider 310. For example, the counter 330 increases a value of variable "i" to correspond to "1" for each rising edge of the divided clock signals and iteratively counts from "0" to "N−1" by "N", which is a natural number, assigned in a register of an analog channel controller. "N" corresponds to a maximum count number performed at the counter 330. The counter 330, at any point in time, receives the synchronizing signal generated at the central clock signal generator or resets the value of variable "i" to "0" when a falling edge of the reset signal is input. The synchronizing signal and the reset signal are input to the AND logic gate 320 connected to the counter 330. The AND logic gate 320 outputs an output signal to control the value of variable "i", which is counted by the counter 330.

The outputter 340 generates an output signal based on waveform information defined by an internal register of analog channel controller, the value of variable "i" determined by the counter, and the divided clock signals received from the divider 310. The outputter 340 generates and outputs an operation clock signal for an analog channel. The output signal generated at the outputter 340 is reset by the reset signal.

FIGS. 4 through 6 are diagrams illustrating examples of generating synchronized operation clock signals by local clock signal generators, in accordance with an embodiment.

An upper graph of FIG. 4 illustrates a waveform of a reference clock signal supplied from a central clock signal generator. For example, the central clock signal generator supplies a reference clock signal having a frequency of 32 kHz to local clock signal generators. A middle graph of FIG. 4 illustrates a waveform of a first operation clock signal used to convert an output signal output from a first analog channel into a digital channel, as an operation clock signal generated from a first local clock signal generator. The lower graph of FIG. 4 illustrates a waveform of a second operation clock signal used to convert an output signal output from a second analog channel into a digital signal, as an operation clock signal generated from a second local clock signal generator.

At a point in time TI, the first operation clock signal is generated based on a control of the first analog channel controller. At a point in time T2, the second operation clock signal is generated based on a control of the second analog channel controller. Referring to FIG. 3, a phase difference corresponding to a degree of a time difference 410 is generated between the first operation clock signal and the second operation clock signal, and an interval 420 at which a high logic state temporally overlaps between the first operation clock signal and the second operation clock signal is generated. A multiplexer and an ADC accurately operate when the interval 420, at which the high logic state temporally overlaps between the first operation clock signal and the second operation clock signal, does not exist. To accurately operate the multiplexer and the ADC, each of local clock signal generators generate in synchronization operation clock signals. A process of adjusting a phase difference among operation clock signals by a central clock signal generator and synchronizing among the operation clock signals will be described with reference to FIGS. 5 and 6.

FIG. 5 is a diagram illustrating an example of synchronizing among operation clock signals by a central clock signal generator, in accordance with an embodiment. An upper graph of FIG. 5 illustrates a waveform of a reference clock signal supplied by a central clock signal generator. A middle graph of FIG. 5 illustrates a waveform of a first operation clock signal generated by a first local clock signal generator. A lower graph of FIG. 5 illustrates a waveform of a second operation clock signal generated by a second local clock signal generator.

At a point in time T4, local clock signal generators are reset and initialized. At a point in time T5, the first local clock signal generator completes a register setting of the first operation clock signal and defines a digital waveform of the first operation clock signal. At a point in time T6, the second local clock signal generator completes a register setting of the second operation clock signal and defines a digital waveform of the second operation clock signal.

The central clock signal generator supplies the reference clock signal to the local clock signal generators on and after the point in time T7 in order to synchronize a reference point with the operation clock signals. Conversely, each of the local clock signal generators blocks an internal supply of the operation clock signal received from the central clock signal generator until the point in time T7. When the central clock signal generator supplies the reference clock signal to the first and the second local clock signal generators subsequent to the point in time T7, a first operation clock signal and a second operation clock signal, of which an overlapping interval of a high logic state does not exist, are generated.

FIG. 6 is a diagram illustrating another example of synchronizing among operation clock signals by a central clock signal generator, in accordance with an embodiment. A first graph of FIG. 6 illustrates a waveform of a reference clock signal supplied by a central clock signal generator. A second graph of FIG. 6 illustrates a waveform of a reference signal supplied by the central clock signal generator. A third graph of FIG. 6 illustrates a waveform of a first operation clock signal generated by a first clock signal generator, and a fourth graph of FIG. 6 illustrates a waveform of a second operation clock signal generated by a second clock signal generator.

Different from FIG. 5, the central clock signal generator continuously supplies a reference clock signal to local clock signal generators, generates an additional synchronizing signal to synchronize a reference point in time among operation clock signals, and supplies the additional synchronizing signal to each of the local clock signal generators. At a point in time, T8, the first local clock signal generator completes a registration setting and generates the first operation clock signal. At a point in time, T9, the second local clock signal generator completes a register setting and generates the second operation clock signal. The first and the second local clock signal generators adjust and output a phase difference among the operation clock signals based on a synchronizing signal received from the central clock signal generator. The first and the second local clock signal generators set a point in time T10 at which a high logic state is appeared as a reference point in time based on the synchronizing signal. The first and the second local clock signal generators adjust and output a phase difference of an operation clock to be output based on the reference point in time.

FIG. 7 is a flowchart illustrating an example of a signal processing method, in accordance with an embodiment.

In operation 710, a central clock signal generator generates a reference clock signal and a synchronizing signal. For example, the central clock signal generator generates a reference clock signal having a predetermined frequency, and supplies the reference clock signal to local clock signal generators connected to the central clock signal generator. The central clock signal generator generates the synchronizing signal to synchronize a reference point in time among operation clock signals to be output from the local clock signal generators, and supplies the synchronizing signal to the local clock signal generators.

In operation 720, the local clock signal generators generate, based on the reference clock signal and the synchronizing signal, operation clock signals for each analog channel. Each local clock signal generator generates the operation clock signals to process an analog signal based on the reference clock signal, and adjusts a phase difference of the operation clock signals based on the reference point in time identified through the synchronizing signal. A phase difference between the operation clock signals output from the local clock signal generators is adjusted based on the synchronizing signal. Operation clock signals of which high logic states do not overlap in an identical time interval are generated.

In operation 730, a processor or an apparatus to process a signal processes the analog signal based on the operation clock signals. For example, based on the operation clock signals, the apparatus to process the signal modulates, demodulates, filters, and amplifies an analog signal, or converts the analog signal into a digital signal.

FIG. 8 is a flowchart illustrating another example of the signal processing method, in accordance with an embodiment.

In operation 810, a central clock signal generator generates a reference clock signal. For example, the central clock signal generator generates a reference clock signal having a predetermined frequency and supplies the reference clock signal to local clock signal generators connected to the central clock signal generator.

In operation 820, the local clock signal generators generate operation clock signals for analog channels based on the reference clock signal subsequent to a point in time at which a predetermined reference is satisfied. The local clock signal generators generate the operation clock signals based on the reference clock signal received from the central clock signal generator subsequent to a register setting of the operation clock signals being completed. The central clock signal generator supplies the reference clock signal to the local clock signal generators, subsequent to the register setting of the operation clock signals being completed. In the alternative, the local clock signal generators block an internal supply of the reference clock signal until the register setting of the operation clock signals is complete.

In operation 830, the apparatus to process the signal processes an analog signal based on the operation clock signals. For example, based on the operation clock signals, the apparatus to process the signal modulates, demodulates, filters, and amplifies an analog signal, or converts the analog signal into a digital signal.

The controllers, generators, outputters, gates, counters, dividers, and channels illustrated in FIGS. 1-3 that perform the operations described herein with respect to FIGS. 7-8 are implemented by hardware components. Examples of hardware components include modules, controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. *. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7-8 that perform the operations described herein with respect to FIGS. 1-3 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus to process a signal, comprising:
   local clock signal generators configured to, based on a reference clock signal, generate operation clock signals for analog channels and, based on a synchronizing signal, adjust a phase difference among the operation clock signals,
   wherein the local clock signal generators are configured to generate operation clock signals of which high logic states do not overlap in an identical time interval.

2. The apparatus of claim 1, further comprising:
   a central clock signal generator configured to supply the reference clock signal and the synchronizing signal to the local clock signal generators.

3. The apparatus of claim 1, wherein the local clock signal generators are configured to generate the operation clock signals based on the synchronizing signal and subsequent to completing a register setting of the operation clock signals for the analog channels.

4. The apparatus of claim 3, wherein the local clock signal generators comprise a counter configured to output a waveform defined based on the register setting, and set a count value as a set value based on the synchronizing signal.

5. An apparatus to process a signal, comprising:
   local clock signal generators configured to, based on a reference clock signal, generate operation clock signals for analog channels and, based on a synchronizing signal, adjust a phase difference among the operation clock signals; and
   local bias signal generators configured to generate operation bias signals for the analog channels based on a reference bias signal.

6. The apparatus of claim 5, further comprising:
   a central bias signal generator configured to supply the reference bias signal.

7. The apparatus of claim 5, wherein the local bias signal generators are configured to generate operation voltage signals for the analog channels based on the reference bias signal being a current signal.

8. The apparatus of claim 1, wherein the operation clock signals comprise at least one of a clock signal to modulate analog signals input through the analog channels, a clock signal to demodulate the analog signals, a clock signal for filtering the analog signals, and a clock signal to sample the analog signals to be converted into digital signals.

9. An apparatus to process a signal, comprising:
   local clock signal generators configured to generate operation clock signals for analog channels based on a reference clock signal and subsequent to a point in time at which a reference is satisfied;
   a central bias signal generator configured to supply a reference bias signal to local bias signal generators; and
   local bias signal generators configured to generate operation bias signals for the analog channels based on the reference bias signal.

10. The apparatus of claim 9, further comprising:
    a central clock signal generator configured to supply the reference clock signal to local clock signal generators.

11. The apparatus of claim 9, wherein the local clock signal generators are configured to generate the operation clock signals based on the reference clock signal and subsequent to completing a register setting of the operation clock signals for the analog channels.

12. The apparatus of claim 11, wherein the local clock signal generators comprise a counter configured to output a waveform defined based on the register setting, and set a count value of the counter as a set value based on a reset signal prior to a point in time at which the reference is satisfied.

13. The apparatus of claim 11, wherein the central clock signal generator is configured to supply the reference clock signal to the local clock signal generators subsequent to completing the register setting of the operation clock signals for the analog channels.

14. The apparatus of claim 9, wherein the local bias signal generators are configured to generate operation voltage signals for the analog channels based on the reference bias signal being a current signal.

15. A method to process a signal, comprising:
generating a reference clock signal and a synchronizing signal; and
generating operation clock signals, using local clock signal generators, for each of analog channels based on the reference clock signal and by adjusting a phase difference among the operation clock signals based on the synchronizing signal,
wherein the generating of the operation clock signals comprises generating operation clock signals of which high logic states do not overlap in an identical time interval.

16. The method of claim 15 wherein the generating of the operation clock signals comprises generating the operation clock signals based on the synchronizing signal subsequent to completing a register setting of the operation clock signals for the analog channels.

17. The method claim 15, wherein the operation clock signals comprise at least one of a clock signal to modulate analog signals input through the analog channels, a clock signal to demodulate the analog signals, a clock signal to filter the analog signals, and a clock signal to sample the analog signals to be converted into digital signals.

\* \* \* \* \*